United States Patent
Chang et al.

(10) Patent No.: US 7,744,262 B2
(45) Date of Patent: Jun. 29, 2010

(54) BACKLIGHT MODULE WITH NONLINEARLY ARRANGED LIGHT EMITTING DIODES AND LIQUID CRYSTAL DISPLAY WITH SAME

(75) Inventors: Li-Chun Chang, Miao-Li (TW); Chun-Yun Pan, Miao-Li (TW); Wei-Hao Hung, Miao-Li (TW)

(73) Assignee: Innolux Display Corp., Miao-Li County (TW)

( * ) Notice: Subject to any disclaimer, the term of this patent is extended or adjusted under 35 U.S.C. 154(b) by 225 days.

(21) Appl. No.: 12/001,613

(22) Filed: Dec. 11, 2007

(65) Prior Publication Data
US 2008/0137007 A1    Jun. 12, 2008

(30) Foreign Application Priority Data
Dec. 11, 2006    (TW) .............................. 95146232 A

(51) Int. Cl.
*F21V 14/00*    (2006.01)
(52) U.S. Cl. ...................... 362/612; 362/97.3
(58) Field of Classification Search ................ 362/612, 362/97.3, 249.02, 249.06
See application file for complete search history.

(56) References Cited

U.S. PATENT DOCUMENTS

| 7,284,874 B2 | 10/2007 | Jeong et al. |
| 7,448,785 B2 * | 11/2008 | Suzuki ....................... 362/612 |
| 2007/0008740 A1 * | 1/2007 | Lee et al. .................... 362/612 |
| 2008/0111471 A1 | 5/2008 | Blumel et al. |
| 2009/0052178 A1 * | 2/2009 | Marchl et al. .......... 362/249.02 |

FOREIGN PATENT DOCUMENTS

| CN | 2454905 Y | 10/2001 |
| DE | 102006002275 A1 | 7/2006 |
| WO | WO 2007034537 A1 * | 3/2007 |

* cited by examiner

*Primary Examiner*—David V Bruce
(74) *Attorney, Agent, or Firm*—Wei Te Chung

(57) ABSTRACT

An exemplary backlight module includes a light guide plate, and a light source positioned for illuminating the light guide plate. The light source includes a plurality of LED units, and each LED unit includes a red LED, two green LEDs, and a blue LED. Each red, green, and blue LED has a center. In each LED unit, the centers of the red LED and the blue LED are at two opposite sides respectively of an imaginary line defined between the centers of the green LEDs.

20 Claims, 3 Drawing Sheets

BACKLIGHT MODULE WITH NONLINEARLY ARRANGED LIGHT EMITTING DIODES AND LIQUID CRYSTAL DISPLAY WITH SAME

FIELD OF THE INVENTION

The present invention relates to a backlight module that includes a plurality of nonlinearly arranged colored light emitting diodes (LEDs), and a liquid crystal display (LCD) including the backlight module.

GENERAL BACKGROUND

Liquid crystal displays are commonly used as display devices for compact electronic apparatuses, not only because they provide good quality images but also because they are very thin. Liquid crystal in a liquid crystal display does not emit any light itself. The liquid crystal requires a light source so as to be able to clearly and sharply display text and images. Therefore, a typical liquid crystal display requires an accompanying backlight module.

Referring to FIG. 7, a typical backlight module 100 includes a light guide plate 120, a light source 110, and a reflector 130, arranged in that order from right to left as shown. The backlight module 100 further includes a plastic frame 140 for accommodating the light guide plate 120, the light source 110, and the reflector 130.

Referring also to FIG. 8, the light source 110 is interposed between the light guide plate 120 and the reflector 130, and includes a plurality of linearly arranged LED units 111. Each LED unit 111 includes a red LED 112, two green LEDs 113, and a blue LED 114, arranged in that order from top to bottom as shown. Each LED 112, 113, 114 can emit light beams of the one respective kind of primary color.

In operation of the backlight module 100, because each LED 112, 113, 114 emits one respective kind of colored light beams, a mixing process of the light beams of different colors occurs. The mixing process generally occurs in a space ranging from where the light beams emit from the LEDs 112, 113, 114 to where the light beams reach the light guide plate 120. Thereby, white light beams enter the light guide plate 120.

An optical performance of the mixed light beams reaching the light guide plate 120 is generally affected by an arrangement of the LEDs 112, 113, 114. The LEDs 112, 113, 114 are arranged along a straight line. Each pair of a red LED 112 and an adjacent blue LED 114 are located adjacent to and between two corresponding pairs of green LEDs 113. That is, in each LED unit 111, a center (not labeled) of the red LED 112 is distanced differently from the two green LEDs 113, and a center of the blue LED 114 is distanced differently from the two green LEDs 113. As a result, the light beams emitted from the LEDs 112, 113, 114 may be non-uniformly mixed, and the mixed light beams reaching the light guide plate 120 are therefore liable to be a little yellow or blue instead of being pure white. This may result in an uneven color balance of light output by the backlight module 100.

What is needed, therefore, is a backlight module that can circumvent, overcome or at least mitigate the above-described difficulties. What is also needed is a liquid crystal display including the backlight module.

SUMMARY

In one preferred embodiment, a backlight module includes a light guide plate, and a light source positioned for illuminating the light guide plate. The light source includes a plurality of LED units, and each LED unit includes a red LED, two green LEDs, and a blue LED. Each red, green, and blue LED has a center. In each LED unit, the centers of the red LED and the blue LED are at two opposite sides respectively of an imaginary line defined between the centers of the green LEDs.

Other aspects, novel features and advantages will become more apparent from the following detailed description when taken in conjunction with the accompanying drawings.

BRIEF DESCRIPTION OF THE DRAWINGS

The components in the drawings are not necessarily drawn to scale, the emphasis instead being placed upon clearly illustrating the principles of at least one embodiment of the present invention. In the drawings, like reference numerals designate corresponding parts throughout various views, and all the views are schematic.

DETAILED DESCRIPTION OF PREFERRED EMBODIMENTS

Reference will now be made to the drawings to describe preferred and exemplary embodiments of the present invention in detail.

Figure 1:
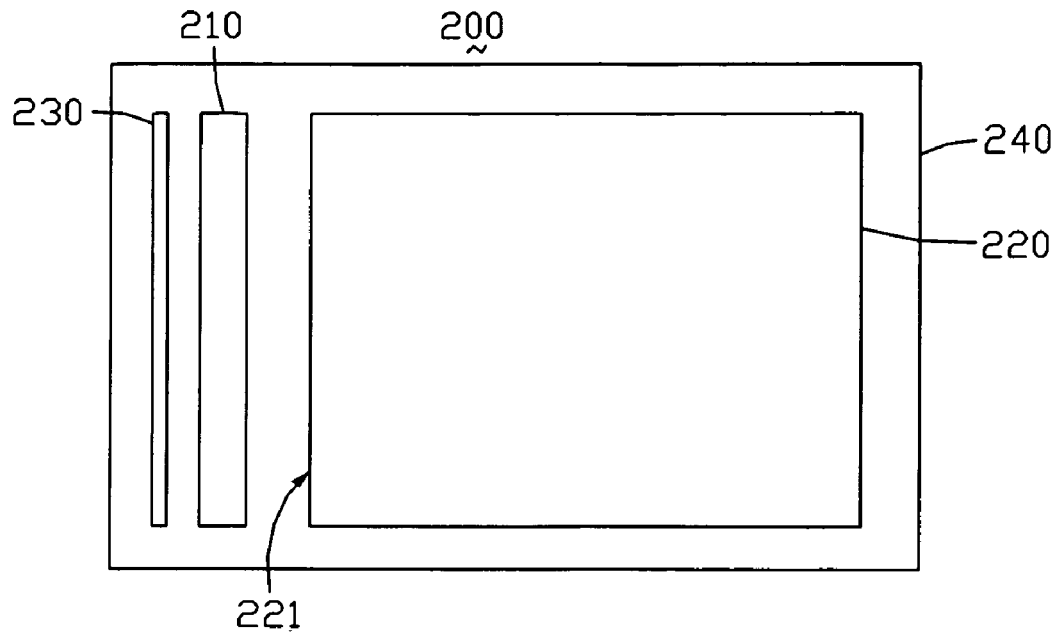
FIG. 1 is a top plan view of a backlight module according to a first embodiment of the present invention, the backlight module including a light source having a plurality of LEDs.

Referring to FIG. 1, a backlight module 200 according to a first embodiment of the present invention is shown. The backlight module 200 is an edge-type backlight module, and includes a light guide plate 220, a light source 210, and a reflector 230 arranged in that order from right to left as shown. The backlight module 200 further includes a frame 240 for accommodating the light guide plate 220, the light source 210, and the reflector 230.

Figure 2:
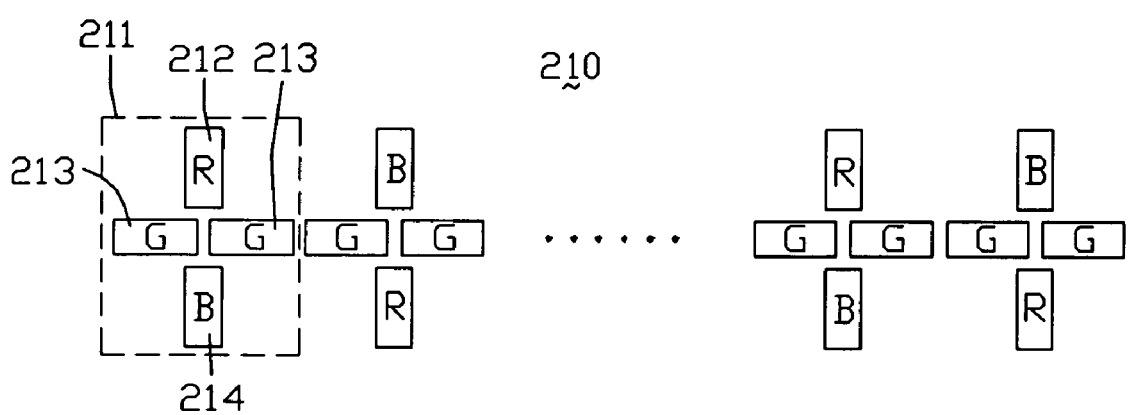
FIG. 2 is an enlarged, abbreviated, top plan view showing an arrangement of the LEDs of the light source of FIG. 1.

Referring also to FIG. 2, the light source 210 is interposed between the reflector 230 and a light incident surface 221 of the light guide plate 220, and includes a plurality of linearly arrayed LED units 211. Each LED unit 211 includes a red LED 212, two green LEDs 213, and a blue LED 214. In the illustrated embodiment, each LED 212, 213, 214 is substantially rectangular, and can emit light beams of the one respective kind of primary color. Each LED 212, 213, 214 defines an imaginary long axis (not labeled) extending along a middle of a length thereof, and an imaginary short axis (not labeled) extending perpendicular to the long axis and being located halfway along the long axis.

In each LED unit 211, the green LEDs 213 are located adjacent to each other end to end. That is, the long axes of the green LEDs 213 are substantially collinearly oriented along a common axis extending along a first direction; and the short axes of the green LEDs 213 are each oriented along a second direction perpendicular to the first direction, and are parallel to each other. The red LED 212 and the blue LED 214 are respectively located at two opposite sides of the common axis of the green LEDs 213. In particular, the long axes of the red LED 212 and the blue LED 214 are substantially collinearly oriented along a common axis extending along the second direction; and the short axes of the red LED 212 and the blue LED 214 are oriented along the first direction. Thus, an arrangement of the LEDs 212, 213, 214 forms a generally cross-shaped configuration. A center (not labeled) of the red LED 212 is equidistant from the two green LEDs 213, and a center (not labeled) of the blue LED 214 is equidistant from the two green LEDs 213.

In the array of LED units 211, the common axis of the green LEDs 213 of each LED unit 211 cooperatively form a common central axis of the light source 210. At one side of the common central axis, along a length of the light source 210, the red LEDs 212 and blue LEDs 214 are alternately arranged. At an opposite side of the common central axis, along the length of the light source 210, the red LEDs 212 and blue LEDs 214 are also alternately arranged. That is, for each two adjacent LED units 211, the red LED 212 of one of the LED units 211 and the blue LED 214 of the other adjacent LED unit 211 are located at a same side of the common central axis of the light source 210.

In operation of the backlight module 200, light beams of one particular primary color emit from each LED 212, 213, 214, and transmit toward the light guide plate 220. Some light beams directly transmit toward the light incident surface 221 of the light guide plate 220, and other light beams transmit toward the light incident surface 221 after being reflected by the reflector 230. Because each LED 212, 213, 214 emits one respective kind of colored light beams, a mixing process of the light beams of different colors occurs. The mixing process generally occurs in a space ranging from where the light beams emit from the LEDs 212, 213, 214 to where the light beams reach the light incident surface 221 of the light guide plate 220. Because the LEDs 212, 213, 214 of each LED unit 211 are arranged in the cross-shaped configuration, with the center of the red LED 212 equidistant from the two green LEDs 213 and the center of the blue LED 214 equidistant from the two green LEDs 213, the light beams can be uniformly mixed during this mixing process. Therefore pure white light beams are achieved when the mixed light beams reach the light incident surface 221 of the light guide plate 220. Thus, the backlight module 200 can provide good optical performance.

Figure 3:
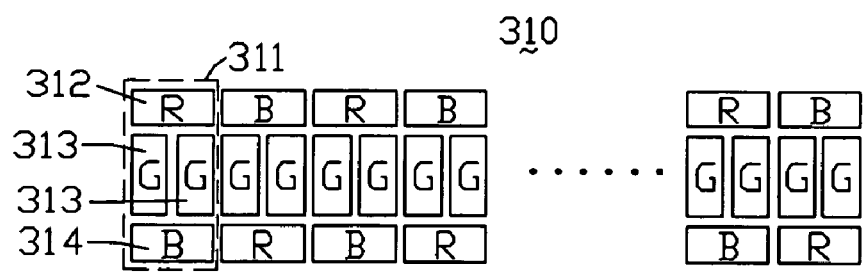
FIG. 3 is an abbreviated, top plan view of an arrangement of LEDs of a light source of a backlight module according to a second embodiment of the present invention.

Referring to FIG. 3, a backlight module (not shown) according to a second embodiment of the present invention is similar to the backlight module 200. However, the backlight module includes a light source 310 having a plurality of LED units 311. Each LED unit 311 includes a red LED 312, two green LEDs 313, and a blue LED 314. Each LED 312, 313, 314 is substantially rectangular, and can emit light beams of the one respective kind of primary color. Each LED 312, 313, 314 defines an imaginary long axis (not labeled) extending along a middle of a length thereof, and an imaginary short axis (not labeled) extending perpendicular to the long axis and being located halfway along the long axis.

In each LED unit 311, the green LEDs 313 are located adjacent to each other side by side. That is, the short axes of the green LEDs 313 are substantially collinearly oriented along a common axis extending along a first direction, and the long axes of the green LEDs 313 are each oriented along a second direction perpendicular to the first direction, and are parallel to each other. The red LED 312 and the blue LED 314 are respectively located at two opposite sides of the common axis of the green LEDs 313. In particular, the long axis of each of the red LED 312 and the blue LED 314 is oriented along the first direction, and the short axes of the red LED 312 and the blue LED 314 are substantially collinearly oriented along a common axis extending along the second direction. The outmost long sides of the green LEDs 313 are coplanar with the corresponding short sides of the red LED 312 and the blue LED 314. In other words, a distance between the outmost long sides of the green LEDs 313 is substantially the same as a length of each of the red LED 312 and the blue LED 314, as measured along the first direction. Thus, an arrangement of the LEDs 312, 313, 314 forms a rectangular configuration. A center (not labeled) of the red LED 312 is equidistant from the two green LEDs 313, and a center (not labeled) of the blue LED 314 is equidistant from the two green LEDs 313.

In the array of LED units 311, the common axis of the green LEDs 313 of each LED unit 311 cooperatively form a common central axis of the light source 310. At one side of the common central axis, along a length of the light source 310, the red LEDs 312 and the blue LEDs 314 are alternately arranged. At an opposite side of the common central axis, along the length of the light source 310, the red LEDs 312 and blue LEDs 314 are also alternately arranged. That is, for each two adjacent LED units 311, the red LED 312 of one of the LED units 311 and the blue LED 314 of the other adjacent LED 311 unit are located at a same side of the common central axis of the light source 310. The backlight module has advantages similar to those described above in relation to the backlight module 200.

Figure 4:
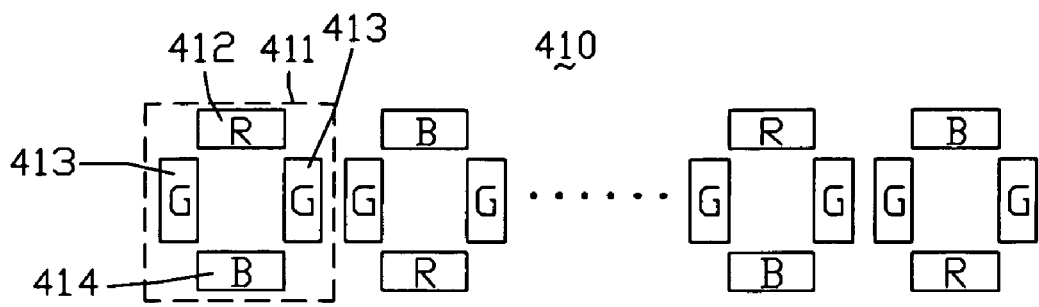
FIG. 4 is an abbreviated, top plan view of an arrangement of LEDs of a light source of a backlight module according to a third embodiment of the present invention.

Referring to FIG. 4, a backlight module (not shown) according to a third embodiment of the present invention is similar to the backlight module of the second embodiment. However, the backlight module of the third embodiment includes a light source 410 having a plurality of LED units 411. Each LED unit 411 includes a red LED 412, two green LEDs 413, and a blue LED 414. In each LED unit 411, the red LED 412, one of the green LEDs 413, the blue LED 414, and the other green LED 413 are arranged in that order generally end to end, thereby forming a generally rectangular configuration that is empty in the middle. A center (not labeled) of the red LED 412 is equidistant from the two green LEDs 413, and a center (not labeled) of the blue LED 414 is equidistant from the two green LEDs 413. In each LED unit 411, the inmost long sides of the green LEDs 413 are respectively coplanar with the corresponding short sides of the red LED 412 and the blue LED 414. In other words, a distance between the inmost long sides of the green LEDs 413 is substantially the same as a length of each of the red LED 412 and the blue LED 414, as measured along the first direction. The backlight module has advantages similar to those described above in relation to the backlight module 200.

Figure 5:
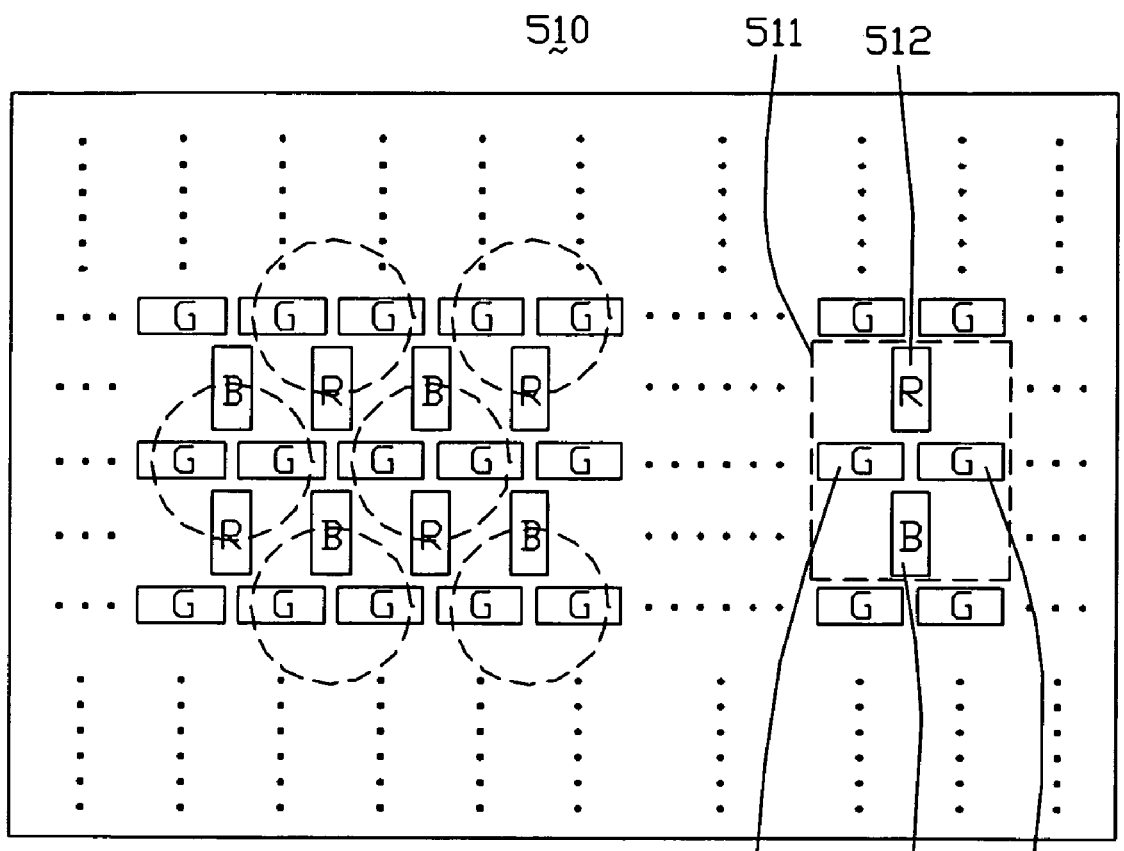
FIG. 5 is an abbreviated, top plan view of an arrangement of LEDs of a light source of a backlight module according to a fourth embodiment of the present invention.

Referring to FIG. 5, a backlight module (not shown) according to a fourth embodiment of the present invention is similar in principle to the backlight module 200. However, the backlight module of the fourth embodiment is a direct-type backlight module that includes a light source 510. The light source 510 includes a plurality of LED units 511, which are arranged in a matrix-type array. Each LED unit 511 includes a red LED 512, two green LEDs 513, and a blue LED 514. Each LED 512, 513, 514 defines an imaginary long axis (not labeled) extending along a middle of a length thereof, and an imaginary short axis (not labeled) extending perpendicular to the long axis and being located halfway along the long axis. The LEDs 512, 513, 514 of each LED unit 511 are arranged in a cross-shaped configuration, in substantially the same manner as the LEDs 212, 213, 214 of each LED unit 211 of the backlight module 200. However, every LED unit 511 in the array has exactly the same configuration. That is, the blue LED 514 is located at a top side (as shown) of the common axis of the green LEDs 513, and the red LED 512 is located at a bottom side (as shown) of the common axis of the green LEDs 513.

The array of LED units 511 can be considered to be comprised of a plurality of parallel rows of LED units 511, with each row extending along a first direction. The LED units 511 in each row are staggered relative to the LED units 211 in each of the two adjacent rows. Further, the LED units 511 in each row are meshed with the LED units 511 in each of the two adjacent rows. That is, each two adjacent rows of LED units 511 cooperatively form a row of red and blue LEDs 512, 514 alternately arranged.

Considered another way, the array of LED units 511 forms a kind of honeycomb pattern, with each LED unit 511 being surrounded by six other LED units 511. The backlight module of the fourth embodiment has advantages similar to those described above in relation to the backlight module 200.

Figure 6:
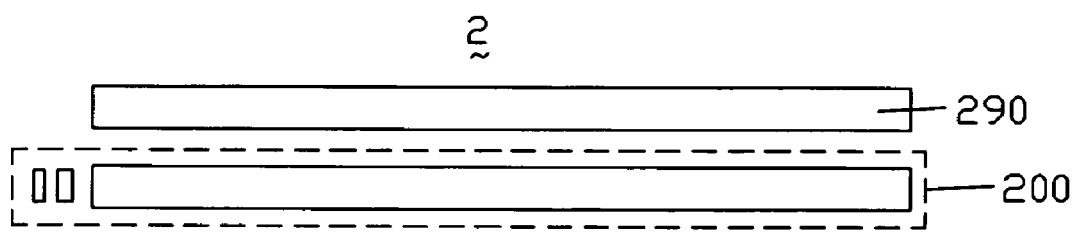
FIG. 6 is an exploded, side-on view of an exemplary liquid crystal display of the present invention, the liquid crystal display including the backlight module of FIG. 1.
Figure 7:
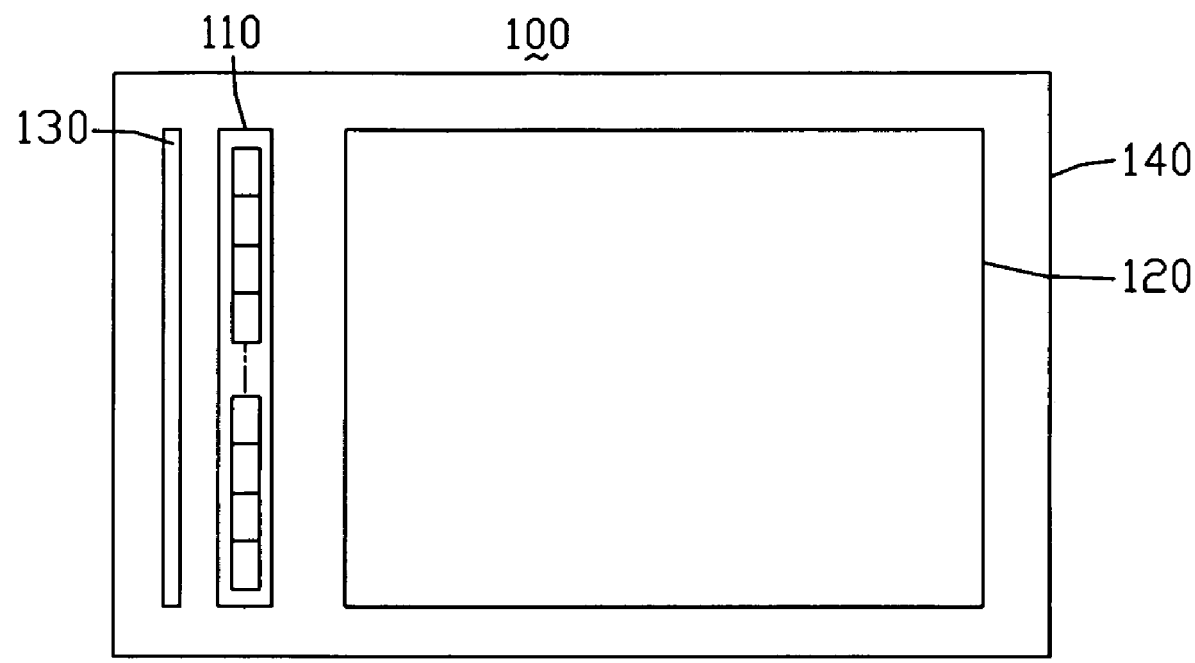
FIG. 7 is an abbreviated, top plan view of a conventional backlight module, the backlight module including a light source having a plurality of LEDs.
Figure 8:
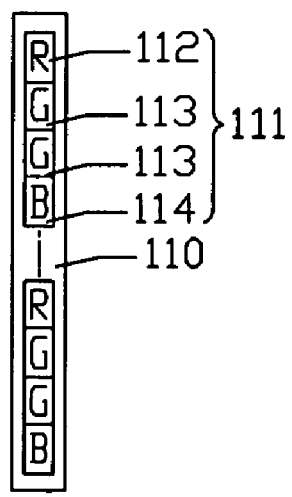
FIG. 8 is an abbreviated, top plan view showing an arrangement of the LEDs of the light source of FIG. 7.

In FIG. 6, a liquid crystal display 2 is shown. The liquid crystal display 2 includes a liquid crystal panel 290, and the backlight module 200 located adjacent to the liquid crystal panel 290. In alternative embodiments, the backlight module 200 can be replaced by any one of the other above-described backlight modules.

It is believed that the present embodiments and their advantages will be understood from the foregoing description, and it will be apparent that various changes may be made thereto without departing from the spirit or scope of the invention or sacrificing all of its material advantages, the examples hereinbefore described merely being preferred or exemplary embodiments of the invention.

What is claimed is:

1. A backlight module comprising:
   a light guide plate; and
   a light source positioned for illuminating the light guide plate, the light source comprising a plurality of light emitting diode (LED) units, each LED unit comprising a red LED, two green LEDs, and a blue LED, each red, green, and blue LED having a center, and each LED defining an imaginary long axis extending along a middle of a length thereof, and an imaginary short axis extending perpendicular to the long axis and being located halfway along the long axis;
   wherein in each LED unit, the centers of the red LED and the blue LED are at two opposite sides respectively of an imaginary line defined between the centers of the green LEDs, and an arrangement of the red LED, the green LEDs, and the blue LED forms a generally cross-shaped configuration.

2. The backlight module as claimed in claim 1, wherein the long axes of the green LEDs are substantially collinearly oriented along a common axis extending along a first direction, and the short axes of the green LEDs are each oriented along a second direction perpendicular to the first direction, the short axes of the green LEDs being parallel to each other.

3. The backlight module as claimed in claim 2, wherein the red LED and the blue LED are respectively located at two opposite sides of the common axis of the green LEDs.

4. The backlight module as claimed in claim 3, wherein the long axes of the red LED and the blue LED are substantially collinearly oriented along a common axis extending along the second direction; and the short axes of the red LED and the blue LED are oriented along the first direction.

5. The backlight module as claimed in claim 1, wherein in each two adjacent LED units, the red LED of one of the two adjacent LED units and the blue LED of the other adjacent LED unit are located at a same side of a common central axis of the light source.

6. The backlight module as claimed in claim 5, wherein each LED unit is surrounded by six adjacent LED units to form a honeycomb pattern array.

7. A liquid crystal display comprising:
   a liquid crystal panel; and
   a backlight module configured for illuminating the liquid crystal panel, the backlight module comprising:
     a light guide plate; and
     a light source positioned for illuminating the light guide plate, the light source comprising a plurality of light emitting diode (LED) units, each LED unit comprising a red LED, two green LEDs, and a blue LED, and each LED defining an imaginary long axis extending along a middle of a length thereof, and an imaginary short axis extending perpendicular to the long axis and being located halfway along the long axis;
   wherein in each LED unit, the two green LEDs comprise a pair of the imaginary long axes and a pair of the imaginary short axes, and one pair of same axes selected from the pair of long axes and the pair of short axes is substantially collinearly oriented along a common axis extending along a first direction, and the red LED and the blue LED are at two opposite sides of the common axis of the green LEDs.

8. A backlight module comprising:
   a light guide plate; and
   a light source positioned for illuminating the light guide plate, the light source comprising a plurality of light emitting diode (LED) units, each LED unit comprising a red LED, two green LEDs, and a blue LED, and each LED defining an imaginary long axis extending along a middle of a length thereof, and an imaginary short axis extending perpendicular to the long axis and being located halfway along the long axis;
   wherein in each LED unit, the two green LEDs comprise a pair of the imaginary long axes and a pair of the imaginary short axes, and one pair of same axes selected from the pair of long axes and the pair of short axes is substantially collinearly oriented along a common axis extending along a first direction, and the red LED and the blue LED are at two opposite sides of the common axis of the green LEDs.

9. The backlight module as claimed in claim 8, wherein in each LED unit, an arrangement of the red LED, the green LEDs, and the blue LED forms a generally cross-shaped configuration.

10. The backlight module as claimed in claim 9, wherein the long axes of the green LEDs are substantially collinearly oriented along the common axis, and the short axes of the green LEDs are each oriented along a second direction perpendicular to the first direction, the short axes of the green LEDs being parallel to each other.

11. The backlight module as claimed in claim 10, wherein the long axes of the red LED and the blue LED are substantially collinearly oriented along a common axis extending along the second direction, and the short axes of the red LED and the blue LED are oriented along the first direction.

12. The backlight module as claimed in claim 8, wherein in each LED unit, an arrangement of the red LED, the green LEDs, and the blue LED forms a generally rectangular configuration.

13. The backlight module as claimed in claim 12, wherein the short axes of the green LEDs are substantially collinearly oriented along a common axis extending along the first direction, and the long axes of the green LEDs are each oriented along a second direction perpendicular to the first direction, the long axes of the green LEDs being parallel to each other.

14. The backlight module as claimed in claim 13, wherein the long axis of each of the red LED and the blue LED is oriented along the first direction, and the short axes of the red LED and the blue LED are substantially collinearly oriented along a common axis extending along the second direction.

15. The backlight module as claimed in claim 14, wherein a distance between the outmost long sides of the green LEDs is substantially the same as a length of each of the red LED and the blue LED, as measured along the first direction.

16. The backlight module as claimed in claim 8, wherein in each LED unit, the red LED, one of the green LEDs, the blue LED, and the other green LED are arranged in that order generally end to end, to form a generally rectangular configuration that is empty in the middle.

17. The backlight module as claimed in claim 16, wherein a center of the red LED is equidistant from the two green LEDs, and a center of the blue LED is equidistant from the two green LEDs.

18. The backlight module as claimed in claim 8, wherein for each two adjacent LED units, the red LED of one of the LED units and the blue LED of the other adjacent LED unit are located at a same side of a common central axis of the light source.

19. The backlight module as claimed in claim 18, wherein each LED unit is surrounded by six adjacent LED units to form a honeycomb pattern array.

20. The backlight module as claimed in claim 8, wherein the backlight module is one of an edge-type backlight module and a direct-type backlight module.

* * * * *